United States Patent Office 3,083,240
Patented Mar. 26, 1963

3,083,240
PROCESS FOR PRODUCING CHLORO-
BROMOMETHANES
Jean Vossen, Brussels, Belgium, and Giulio Cesare
Agostini, Ferrara, Mario Manca, Rosignano Solvay,
and Lido Meini, Ferrara, Italy, assignors to Società
Chimica Dell' Aniene, S.p.A., Rosignano, Italy, a company of Italy
No Drawing. Filed Mar. 31, 1960, Ser. No. 18,850
Claims priority, application Belgium Aug. 28, 1959
5 Claims. (Cl. 260—664)

The present invention concerns a process for producing chlorobromomethane, more particularly monochloro-monobromomethane.

It is known that it is possible to produce monochloro-monobromomethane by bromination of methylene chloride in the liquid phase in the presence of aluminium (German Patent No. 727,690 and U.S. Patent No. 2,694,-094). In the course of the process undesirable aluminium chloride is formed. In industrial production, its separation and utilization present serious difficulties which render the bromination process uneconomical.

It is also known to carry out the bromination of methyl chloride in order to obtain monochloro-monobromomethane (British Patent No. 759,969). The reaction produces hydrobromic acid. This acid may be rejected or treated with chlorine in order to displace the bromine which is recycled to the bromination process. In the first case a large proportion of bromine is lost. In the second case an additional process is necessary. These attendant problems increase the cost price of the monochloro-monobromo-methane.

We have overcome these difficulties and disadvantages of the aforesaid processes by carrying out the chlorobromination of chlorinated methane. We thus avoid the appearance of the undesirable hydrobromic acid, due to the presence of chlorine in the reaction medium, thus permitting a more advantageous utilization of the bromine.

The present invention has as object a process of producing chlorobromomethanes characterized in that a chlorinated methane is subjected to the simultaneous action of bromine and chlorine used in a molecular ratio of about 1.

By subjecting methyl chloride to the chlorobromination monochloro-monobromomethane is initially formed by the new process according to the reaction:

$$CH_3Cl + \tfrac{1}{2}Br_2 + \tfrac{1}{2}Cl_2 \rightarrow CH_2ClBr + HCl \qquad (1)$$

By substituting one hydrogen atom for one bromine atom in the reaction product (1), monochloro-dibromomethane is formed according to the reaction:

$$CH_2ClBr + \tfrac{1}{2}Br_2 + \tfrac{1}{2}Cl_2 \rightarrow CHClBr_2 + HCl \qquad (2)$$

In an analogous manner there is obtained $$CHClBr_2 + \tfrac{1}{2}Br_2 + \tfrac{1}{2}Cl_2 \rightarrow CClBr_3 + HCl \qquad (3)$$

In addition to the three chlorobromomethanes, the final product always contains a certain quantity of methylene chloride which is undesirable product and results from the substitution reaction which takes place between the methyl chloride and the chlorine used. In order to reduce the formation of methylene chloride it is necessary to limit as much as possible the part played by chlorine to that of the agent which displaces the bromine of the hydrobromic acid formed in situ. This is attained by maintaining at the inlet of the reactor a chlorine/bromine molecular ratio of about 1.

The chlorobromomethanes resulting from the reactions (1), (2) and (3) are in the final reaction product in variable quantities which depend on the methyl bromide/chloride ratio at the inlet of the reactor. It is therefore possible to choose the ratio so that a predetermined chlorobromomethane is obtained in a preponderant quantity.

Thus, if monochloro-monobromomethane is the desired product, a methyl bromide/chloride molecular ratio between 0.01 and 0.35 will be maintained at the inlet of the reactor.

Likewise, if it is intended to obtain monochlorodibromomethane or monochloro-tribromomethane in a preponderant quantity, the respective methyl bromide and methyl chloride molecular ratio to be used will be of the order of 1 or 1.5.

On the other hand, it is possible to increase a predetermined chlorobromomethane yield by recycling in the reaction medium the other chlorobrominated compounds which have been separated by rectification from the recovered crude product. This recycling results in shifting the equilibrium of the undesirable reactions in a favourable direction.

An advantageous mode of carrying out the process which forms the object of the present invention consists in subjecting methyl chloride in a gaseous phase to the action of bromine and chlorine in a reacting vessel heated to 200–450° C.

In this case, the exothermic reaction taking place in situ between the hydrobromic acid and chlorine yields a large quantity of heat, an advantage not occurring in the simple thermic bromination.

In addition, the simultaneous introduction of chlorine and bromine into the reaction vessel leads by reason of the part played by chlorine "in situ" to a more economical utilisation of the bromine.

Thus, in the case of the simple thermic bromination of methyl chloride for producing monochloro-monobromomethane the rate of gas introduction into the reaction vessel cannot be higher than 20 gram mol/hr./dm.³ if the whole bromine used is to react, and the yield of crude chlorobrominated product is of the order of 8 kg./day/dm.³.

On the other hand, in the thermic chlorobromination the rate of gas can reach 30 gram mol/hr./dm.³ with a production of the order of 20 kg./day/dm.³.

The chlorobromination of chlorinated methanes can also be carried out according to the process of the present invention in an inert liquid phase at ordinary temperature by the action of actinic rays. The reaction speed is in this case slower than in the thermic chlorobromination.

The process according to the present invention for the chlorobromination of methyl chloride described above may also be successfully applied to the production of brominated derivatives of methylene chloride and chloroform. The chlorobromomethane are excellent extinguishing agents.

The following examples illustrate the process of the present invention. They concern more particularly the production of monochloro-monobromomethane by a thermic process but they must not be considered as limiting the scope of the invention to the only mode of carrying out the process and to the production of only chlorobromomethane.

*Example 1*

A gas current comprising methyl chloride, bromine and chlorine is introduced at the rate of 24.3 gram mol/hr./dm.³ of the apparatus into a stainless steel reactor provided with an air-cooled and magnesia-heat-insulated jacket. The reactor is kept at an average temperature of 343° C. Methyl bromide and methyl chloride are used in a molecular ratio of 0.14, chlorine and bromine in a molecular ratio of 1.05.

The composition of the crude product thus obtained expressed in gram mol percent after separation of unreacted methyl chloride which is recycled is as follows:

| | |
|---|---|
| Monochloromonobromomethane | 76.2 |
| Monochlorodibromomethane | 9.8 |
| Monochlorotribromomethane | 0.7 |
| Methylene chloride | 6.2 |
| Dichloromonobromomethane | 4.7 |
| Dibromomethane | 2.4 |
| | 100. |

113 gram mol/day/dm.$^3$ per reactor of the product are thus obtained.

Only 6.5% of the bromine used is recovered in the form of hydrobromic acid.

*Example 2*

Into the reactor used in the experiment described in Example 1 methyl chloride, bromine and chlorine are introduced at the rate of 24.3 gram mol/hr./dm.$^3$ per reactor. The latter is kept at an average temperature of 332° C. Methyl bromide and methyl chloride are used in a molecular ratio of 0.12, chlorine and bromine in a molecular ratio of 0.93.

The composition of the crude product thus obtained expressed in gram mol percent after separation of unreacted methyl chloride which is continuously recycled is as follows:

| | |
|---|---|
| Monochloromonobromomethane | 79.5 |
| Monochlorodibromomethane | 10.5 |
| Monochlorotribromomethane | 0.5 |
| Methylene chloride | 3.8 |
| Dichloromonobromomethane | 3.8 |
| Dibromomethane | 1.9 |
| | 100. |

The above crude product is obtained at a rate of 104 gram mol/day/dm.$^3$ per apparatus.

7.9% of the bromine used is recovered in the form of hydrobromic acid.

*Example 3*

As described in the preceding examples, a mixture of methyl chloride, bromine and chlorine is introduced at a rate of 31.3 gram mol/hr./dm.$^3$ per apparatus into the reactor kept at 341° C. The molecular ratios methylbromide/methyl chloride and chlorine/bromine are 0.15 and 1.32, respectively.

The product thus obtained and freed from unreacted methyl chloride has the following composition in gram mol percent:

| | |
|---|---|
| Monochloromonobromomethane | 67.4 |
| Monochlorodibromomethane | 6.8 |
| Monochlorotribromomethane | 0.0 |
| Methylene chloride | 14.7 |
| Dichloromonobromomethane | 7.8 |
| Dibromomethane | 3.3 |
| | 100. |

The production increases to 168 gram mol/day/dm.$^3$, and 8.3% of the bromine used is lost in the form of the hydrobromic acid.

What is claimed is:

1. A process for the production of chlorobromomethanes which comprises introducing, in vapor form, a chlorinated methane containing at least one hydrogen atom, into a thermal reaction zone, and simultaneously introducing chlorine and bromine into said zone for simultaneous contact with said chlorinated methane, said zone being maintained at a temperature of 200 to 250° C. during said simultaneous contact, and said chlorine and bromine being present in said reaction zone in the molecular ratio of about 1.

2. A process for the production of at least one chlorobromomethane which comprises introducing monochloromethane, in vapor form, into a thermal reaction zone, and simultaneously introducing chlorine and bromine into said zone for simultaneous contact with said monochloromethane, said zone being maintained at a temperature of 200 to 250° C. during said simultaneous contact, and said chlorine and bromine being present in said reaction zone in the molecular ratio of about 1.

3. A process for the production of monochloromonobromomethane which comprises introducing monochloromethane, in vapor form, into a thermal reaction zone, and simultaneously introducing chlorine and bromine into said zone for simultaneous contact with said monochloromethane, said zone being maintained at a temperature of 200 to 250° C. during said simultaneous contact, said chlorine and bromine being present in said reaction zone in the molecular ratio of about 1 and the molecular ratio of bromine and monochloromethane being between 0.01 and 0.35.

4. A process for the production of monochlorodibromomethane and monochlorotribromomethane which comprises introducing monochloromethane, in vapor form, into a thermal reaction zone, and simultaneously introducing chlorine and bromine into said zone for simultaneous contact with said monochloromethane, said zone being maintained at a temperature of 200 to 250° C. during said simultaneous contact, said chlorine and bromine being present in said reaction zone in the molecular ratio of about 1, and the molecular ratio of bromine and monochloromethane being between 1 and 1.5.

5. A process for the production of chlorobromomethanes which comprises introducing, in vapor form, a chlorinated methane containing at least one hydrogen atom, into a thermal reaction zone, and simultaneously introducing chlorine and bromine into said zone for simultaneous contact with said chlorinated methane, said zone being maintained at a temperature of 200 to 250° C. during said simultaneous contact and said chlorine and bromine being present in said reaction zone in the molecular ratio of about 1, and after separation of the desired chlorobromomethane from the reaction product the undesired compounds are recycled in the reaction medium in order to shift the reaction equilibrium in the desired direction.

References Cited in the file of this patent

FOREIGN PATENTS 759,969     Great Britain       Oct. 24, 1956